United States Patent Office 3,414,013
Patented Dec. 3, 1968

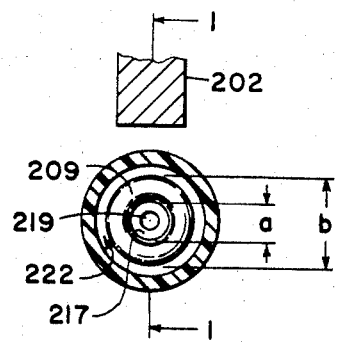
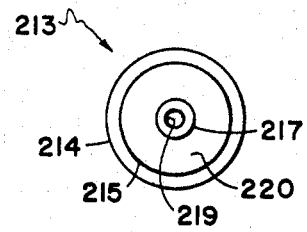
Fig. 2    Fig. 3
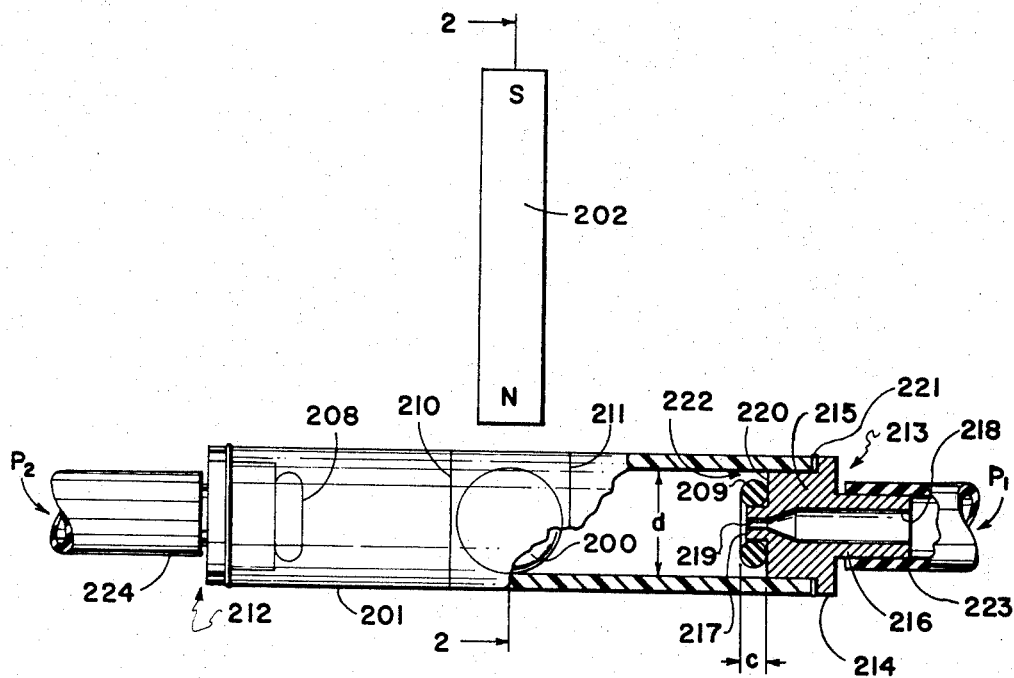
Fig. 1 ively eliminated when the ball leaves the ring, and leakage past the ball results.

3,414,013
DIFFERENTIAL PRESSURE INDICATOR
Howard R. Jaquith, Rochester, N.Y., assignor to Taylor Instrument Companies, Rochester, N.Y., a corporation of New York
Filed Sept. 16, 1966, Ser. No. 580,019
8 Claims. (Cl. 137—557)

ABSTRACT OF THE DISCLOSURE

A differential pressure indicator has a ball held in the middle of a tube by a magnet. A small differential in pressures at the ends of the tube moves the ball to the lower pressure end of the tube where it seats on an O-ring. The O-ring has an interference fit on a nipple which extends a little more than half way into the O-ring, and conducts fluid pressure into the tube.

---

The present invention relates to improvements in differential pressure indicators such as that disclosed and claimed in the pending prior application of J. Philip Hurdle, S.N. 442,962, filed Mar. 26, 1965 for "Process Control System," and assigned to the assignee of the present invention. The objects of the invention will be evident upon persual of the description and claims hereof.

In the example of the present invention, now to be described, the differential pressure element is a ball in a tube connected at its ends to the sources of fluid pressure, the difference between which is to be indicated. Above a cartain magnitude of this difference, the ball sealing seats on one or the other of a pair of O-rings, each O-ring being mouted on a nipple extending into the tube.

In the drawing:

FIGURE 1 is an elevation of a differential pressure indicator according to the invention, partly in section taken along line 1—1 of FIGURE 2;

FIGURE 2 is a section taken on line 2—2 of FIGURE 1, at right angles to the section 1—1; and FIGURE 3 is a plan view of an element of FIGURE 1.

As shown, a differential indicator DD according to the present invention is mainly identical to the differential pressure indicator D of FIGURES 1 and 2 of the aforesaid Hurdle application. As in Hurdle's disclosure, in the present case there is a magnetic ball 200, slidably received in a transparent tube 201 and biased into position by a magnet 202, pressures $P_1$ and $P_2$ of suitable fluid pressure sources (not shown) being applied to the respective ends of the tube 201, and O-rings 208 and 209 being provided for sealing seating ball 200 at either end of the tube. Index marks 210 and 211 on the tube inidate the ball position for substantial equality between pressures $P_1$ and $P_2$.

The structure thus far described also operates as, and has the utility disclosed by the aforementioned Hurdle application, the disclosure of which is considered part of the present application.

Briefly, magnet 202 is so positioned and its strength is so chosen that the ball 200 will maintain the position shown as long as $P_1$ and $P_2$ do not differ by more than a predetermined amount, for example, one such that the two pressures can be considered equal for practical purposes, as long as their difference does not exceed that amount. Preferably, the ball fits just closely enough in the bore of tube 201 as to minimize leakage past the ball, but without binding. If desired, the magnetic bias can be enough that the tube can be tilted from horizontal without the ball breaking out of its illustrated position. Once the difference between $P_1$ and $P_2$ is large enough to move the ball at all, the attraction of magnet 202 drops off so abruptly that an insignificant increase in said difference results in the ball moving all the way to one end of the tube 201. Ordinarily, the indicator will be positioned horizontally enough that the difference in $P_1$ and $P_2$ needed to move the pall to an end of the tube is substantially the same, regardless of its sense.

According to the present invention, the O-rings 208 and 209 are mounted in the tube 201 in such a way that they are not unfavorably stressed. As shown, the O-rings 208 and 209 are mounted by fittings 212 and 213 closing the ends of the tube 201. As is evident from the drawing, fitting 213 has cylindrical portions 214, 215, 216, and 217, decreasing the diameter in the order enumerated. A bore 218 terminating in a restriction 219 (for damping purposes) provides a passage for applying fluid pressure $P_1$ to the right side of ball 200. Fitting portion 216 provides a nipple received in the end of a connection 223, and fitting portion 217 provides a nipple mounting the O-ring 209. Convieniently, the tube 201, its bore and the enumerated fitting portions are right-circular cylinders in form and coaxially located. O-ring 209 (see FIGURE 2, in which the ball 200 is omitted) is circular having inner and outer diameters $a$ and $b$. The ring depth is $c$ which is also the diameter of its cross-sections on a diametral plane through the ring. The diameter of the bore of the tube 201 is $d$ and preferably $d$ is enough larger than $b$ that the outer periphery of the ring does not touch the bore surface with sufficient force to distort the ring. The height of the cylindrical portion or nipple 217 of fitting 214 is enough less than $c$ that if the ball moves to the right to seat on O-ring 209, the surface of the ball is in continuous sealing contact all the way around the hole through the O-ring, but without touching the nipple 217. Of course, under sufficient pressure, the ball could compress the O-ring 209 enough to touch the nipple 209, but preferably such should not happen at the highest pressure differential expected during use of the indicator.

The inner diameter $a$ of O-ring 209 is slightly less than the diameter of nipple 217, and the axial length of the nipple 217 is a little larger than half the ring depth $c$. Accordingly, the ring has an interference fit on the nipple, the friction of which alone holds it in place, except that when the ball seats on the ring, the ring is supported on and compresses against the next adjacent annular flat surface 220 of fitting portion 215. Fitting 213 is rigidly and sealingly fixed to the tube 201 by any suitable means such as epoxy joint 221.

The O-ring and fitting arrangement including fitting 212, is identical to that described next supra, hence, needs no separate describtion here. As shown, connections 223 and 224, which may be flexible tubes, provide for conducting $P_1$ and $P_2$ to the indicator.

One advantage of the described end structure is that an annular space 222 is provided between the bore surface of tube 201 substantially all the way around the periphery of the O-ring 209. Therefore, when the ball 200 compresses the ring against surface 220, the ring can expand freely. In the Hurdle indicator D, the outer diameter $b$ of the ring was larger than tube bore diameter $d$, hence, the ring was compressed radially inwardly of its axis, an arrangement that held it in place by interference fit, was convenient for assembly purposes, and made for simplicity and economy of parts. However, it appears that such compression buckled the surface of the O-ring. As can be seen from the drawing, the spherical ball 200 must contact a circle on the O-ring surface, in a plane parallel to the plane corresponding to the section line 2—2, for there to be a seal. Again, there must be a circle of ring surface in contact with fitting portion surface 220, for sealing.

If the surface of the ring buckles at such circles, there can be one or more interstices between ball and ring, or between ring and fitting portion surface 220, when the ball is seated. Morover, if the ball is forced against the ring, such interstice or interstices are not usually eliminated and, in fact, in the use and form of construction contemplated in the Hurdle application, it is found that such interstice or interstices do appear to occur, that the differential pressure seating the ball on the ring is inadequate to close such interstice or interstices, and that an undesirable amount of leakage occurs via such interstice or interstices, through the gauge. (It will be recalled, from the Hurdle application, that when the ball is not seated, the differential pressure is insufficient to create significant flow between the ball and the surface of the tube bore, and only when the differential pressure is high enough to seat the ball on one of the O-rings can there be significant flow past the ball.)

Another advantage of the present invention is that the radically outward deformation of the O-ring 209, by its interference fit on nipple 217, does not buckle the ring surface, and accordingly, no interstices occur. The deformation is entirely symmetrical (and very slight, of course) so that ball 200 and surface 220 can still make a continuous circular seating contact with the surface of O-ring 209. The above-described advantages may be gauged by the fact that, with the original Hurdle construction, from 20 to 80 percent of any given lot of gauges could be expected to have the defect of excessive fluid leakage through or past the ball and O-ring seal, when tested. With the construction according to the present invention, such defect occurs in only 2 or 3 percent of a given lot of gauges.

The drawing dimensions, it is to be noted, are about seven times those of an actual example of the indicator. Thus, in such actual example, ball 201 is a sphere 1/8" in diameter and the distance between opposing faces of the O-rings is 1/2". However, it will be evident to those skilled in the art that the invention can be practiced with modifications as to dimensions of parts, and of their shape, as well.

For instance, circularity of the various parts has been stressed partly in the interests of explanation and partly because it is possibly the most economical and simple configuration. The basic criteria are, however, that the O-rings be of such shape that the ball or other piston-like element can seat in them in a closed path of contact around nipple 217, and that the interference fit on the nipple 219 deforms the ring symmetrically, without ring surface buckling away from where sealing contact is supposed to occur.

Having described my invention as required by the statutes, I claim:

1. In a ball gauge including a tube having a bore, a ball in said bore, and a pressure connection at one end of said bore, said ball gauge being constructed and arranged to have said ball positioned and spaced from said end when the other end of said bore is provided with fluid pressure that is not greater than fluid pressure on the other side of said ball from said other end, the improvement wherein said pressure connection is a fitting which closes said one end of said bore, provides for admitting the last said fluid pressure thereto, and includes an O-ring mounted thereon; said O-ring having its opening oriented and dimensioned to seat said ball sealingly thereon and to be smaller in diameter than said ball; said O-ring being of outer dimensions such as to fit substantially without friction into the said one end of said bore, and there being O-ring supporting means in the form of a cylindrical nipple on said fitting, said nipple extending into the opening of said O-ring, more than half way through said O-ring but enough less than all the way that said ball can seat sealingly on said O-ring without touching said nipple.

2. The ball gauge of claim 1, wherein the other end of said tube is provided with a pressure connection like said first said pressure connection, and means is provided yieldingly biasing said ball into a position spaced from each O-ring.

3. A fluid pressure operated indicating device including a tube having a bore closed at one end, a ball slidably and fittingly received in said bore, an O-ring supported in said bore at said one end, means biasing said ball into a position in said bore spaced from said one end; said O-ring oriented so that its opening faces said ball, said opening being smaller than said ball, and the outer periphery of said O-ring being spaced from said tube substantially all the way around said periphery; there being provision for admitting fluid into the said bore of said tube via the said opening, said provision being a cylindrical nipple extending into said opening for more than half the depth of said opening, but enough less than all said depth that said ball can seat sealingly on said O-ring over said opening without touching said nipple.

4. The invention of claim 3, wherein said bore is closed at its other end, has a second O-ring like the first said O-ring supported at said other end like said first said O-ring, said position in said bore being spaced from said other end, there being provision made for admitting fluid pressure into the said bore of said tube via the opening of said second O-ring.

5. The invention of claim 3, wherein said provision is a nipple extending into said opening for more than half the depth of said opening but less than all the depth of said opening, and said opening having an interference fit on said nipple.

6. The invention of claim 5, wherein said bore is closed at its other end, and has provision for admitting fluid into the said bore of said tube in the form of a second nipple like the first said nipple, there being a second O-ring like the first said O-ring and arranged on said second nipple like the first said O-ring is arranged on said first said nipple; said position in said bore being spaced from said other end.

7. The invention of claim 1, wherein said O-ring has an interference fit on said nipple.

8. The invention of claim 3, wherein said O-ring has an interference fit on said nipple.

References Cited

UNITED STATES PATENTS

| 2,279,513 | 4/1942 | Hage | 251—121 |
| 2,608,376 | 8/1952 | Adams | 251—144 |
| 3,055,391 | 9/1962 | Shuk et al. | 137—516.25 |
| 3,126,739 | 3/1964 | Whitehill | 73—205 |
| 3,319,924 | 5/1967 | Wilson | 251—26 |

HAROLD W. WEAKLEY, *Primary Examiner.*